United States Patent [19]
Gasse et al.

[11] Patent Number: 5,906,850
[45] Date of Patent: May 25, 1999

[54] MULTILAYER, THERMOFORMABLE, HEAT SEALABLE FILM AND USE THEREOF IN THE PRODUCTION OF BOIL-CURED PRODUCTS

[75] Inventors: Andreas S. Gasse; Heinrich Henze-Wethkamp; Rudi Klein, all of Walsrode, Germany

[73] Assignee: Wolff Walsrode AG, Walsrode, Germany

[21] Appl. No.: 08/606,826

[22] Filed: Feb. 26, 1996

[30] Foreign Application Priority Data

Mar. 2, 1995 [DE] Germany .......................... 195 07 215

[51] Int. Cl.$^6$ ....................................... B32B 27/34
[52] U.S. Cl. ...................... 426/412; 428/34.3; 428/34.8; 428/474.9; 428/473.8; 428/213; 428/214; 428/522; 426/520; 264/173.16
[58] Field of Search .............................. 428/474.4, 476.3, 428/34.1, 34.9, 516, 34.8, 34.3, 35.2, 522, 474.9, 475.8, 213, 214; 426/393, 412, 520; 264/173.16; 206/524.1, 524.2

[56] References Cited

U.S. PATENT DOCUMENTS 5,433,982  7/1995  Yamada et al. ...................... 428/35.7

FOREIGN PATENT DOCUMENTS 0526814  2/1993  European Pat. Off. .

OTHER PUBLICATIONS

Database WPI, Section Ch, Week 8152, Derwent Publication Ltd., London, GB; Class A94, AN 81–9571D XP002017942 & JP–A–56 146 756 (Asahi Dow KK), Nov. 14. 1981).

Database WPI, Section Ch, Week 9316, Derwent Publications Ltd., London, GB; Class A14, AN 93–128997 XP002017943 & JP–A–05 064 866 (Mitsui Du Pont Polychemical), Mar. 19, 1993).

Database WPI, Section Ch, Week 8403, Derwent Publications Ltd., London, GB; Class A32, AN 84–013933 XP002017944 & JP–A–58 205 765 (Mitsui Polychemical), Nov. 30, 1983).

*Primary Examiner*—Paul Thibodeau
*Assistant Examiner*—D. Lawrence Tarazano
*Attorney, Agent, or Firm*—Sprung Kramer Schaefer & Briscoe

[57] ABSTRACT

The present application relates to a multilayer film with the layer structure A1 / B1 / A2 / C / D, wherein A1) is a polyamide layer (PA),
B1) is a coupling agent layer (HV1),
A2) is a polyamide layer (PA),
C) is a coupling agent layer (HV2), which optionally consists of 2 layers of different or identical materials,
D) is a sealing layer (I) made from a type ionomer, the film is thermoformable and heat sealable and further conventional auxiliary substances and additives may be present in the individual layers.

9 Claims, No Drawings

MULTILAYER, THERMOFORMABLE, HEAT SEALABLE FILM AND USE THEREOF IN THE PRODUCTION OF BOIL-CURED PRODUCTS

The present invention relates in general to a multilayer film which is thermoformable and heat sealable. The film is particularly suitable for the production of boil-cured products.

Many meat products, such as for example boil-cured products, are produced by heat treatment (boiling, pasteurisation etc.) of the product in a container, such as for example a film.

The films used for this purpose are generally known as cook-in films. The production of boil-cured products and the packaging processes used to this end have been described in the literature (E. Wirth et al., *Richtwerte der Fleischtechnologie,* Deutscher Fachverlag (1990); Bundesanstalt für Fleischforschung, *Technologie der Kochwurst und Kochpökelware,* Kulmbach (1988)).

The use of films for this application has long been known. The films are often thermoformed into a suitable shape on a standard thermoforming machine. The prepared contents are conveyed, for example laid, into the resultant depression (tray). The filled tray is then sealed with an additional film (lidding film), the volume between the lid and contents of the tray optionally being partially evacuated, and the lidding film sealed, i.e. firmly joined, to the tray film. A cutting process generally follows in which the packages, which are still joined together, are separated into individual packages.

Further processing is performed by leaving the contents in the package and subjecting them to a boiling or pasteurisation process.

The package is sometimes initially heated for a short period, for example by immersion in a temperature-controlled water bath in order to ensure increased shrinkage of the film package around the contents.

The time/temperature conditions of the boiling or pasteurisation operation in a film package generally comprise extended, slow heating or immersion in almost boiling water or heating in steam. Treatment may also be performed in an autoclave. The entire package may additionally be enclosed in an appropriate mould, for example made of metal or plastic. Periods of 12 hours and temperatures of 70 to 95° C. may conventionally be achieved. The films must be resistant to delamination and the sealed seams must be sufficiently strong under these conditions.

Good shrinkage capacity of the films is advantageous during the boiling or pasteurisation process as intimate contact with the film package distinctly reduces any exudation of liquid and the formation of jelly and fat deposits. In this manner, the overall yield of the product which is to be sold may be increased. The exudation of liquid may also be distinctly reduced by good adhesion of the inner film layer to the surface of the contents (this adhesion is known as cooking adhesion). Cooking adhesion should not, however, be so high that the surface of the contents is undesirably damaged and pieces of meat are, for example, torn out.

A multilayer film suitable for boiling in the package and which is treated with ionising radiation to ensure adhesion to the meat product during boiling is known from EP 0127 296.

DE 3320584 describes a multilayer film usable for boiling which has an inner and outer layer containing propylene which was additionally irradiated.

EP 0573306 discloses a biaxially oriented, shrinkable multilayer film which has an internal PA copolymer layer and is also irradiated.

Multilayer films for cook-in applications with a special barrier layer, for example against 02 permeation, which are irradiated are also of interest (CA 2 038 757, EP 0594918).

AU 9 182 740 describes a multilayer cook-in film with a corona treated LLDPE sealing layer.

As may be seen from this review, it is vitally necessary according to the prior art to produce films for cook-in applications with irradiation or corona treatment or a similar surface treatment, in particular in order to achieve the cooking adhesion desired for cook-in applications. This constitutes a disadvantageous additional processing stage during production.

The object therefore arises of providing a thermoformable and heat sealable film for which additional irradiation or corona treatment is not necessary during production, which satisfies the requirements for use as a cook-in film and with which a desired cooking adhesion between the film and contents is achieved.

The film must be thermoformable and heat sealable and thus usable on modern automatic thermoforming machines for packaging applications. The film must thus also have sufficiently good slip properties.

The film must withstand the thermal and mechanical stresses occurring during further processing of the boil-cured products. This means that the films must be resistant to delamination, i.e. the layers forming the film must not become separated from each other. The heat sealed seams must also resist bursting.

The film must be shrinkable when exposed to heat so as to cling closely to the contents and it must exhibit a desired adhesion to the contents. Additionally, where possible, as little jelly as possible should be formed and deposited.

This object was surprisingly achieved by a multilayer film with the layer structure A1 / B1 / A2 / C / D, which film is characterised in that A1) is a polyamide layer (PA), B1) is a coupling agent layer (HV1), A2) is a polyamide layer (PA), C) is a coupling agent layer (HV2), which optionally consists of 2 layers of different or identical materials, D) is a sealing layer (I) made from a zinc type ionomer, that the film is thermoformable and heat sealable and that further conventional auxiliary substances and additives may be present in the individual layers. The film is suitable in particular for use in the production of boil-cured products.

Conventional auxiliary substances and additives may be the stabilisers, processing auxiliaries, lubricants, antiblocking agents and the like added to the polymeric raw materials.

The polyamide consists of the aliphatic polyamides PA-6, PA-11, PA-12, PA-6,66, PA-6,8, PA-6,9, PA-6,10, PA-6,11, PA-6,12, a copolymer prepared from the monomer units contained therein, of an aromatic or partially aromatic polyamide or of a mixture of the stated polyamides.

Polyamide 6 or mixtures of polyamide 6 and an aromatic polyamide are preferably used, wherein the ratio of PA-6 to the aromatic polyamide is 90:10 to 80:20.

A coupling agent which is suitable according to the invention is an anhydride-modified polyethylene, an acid copolymer of ethylene like EAA or EMAA, an acid-modified ethylene vinyl acetate, an acid-modified ethylene (meth)acrylate, anhydride-modified ethylene (meth) acrylate, an anhydride-modified ethylene vinyl acetate, an acid/acrylate-modified ethylene vinyl acetate or a polymer blend containing at least one of the above-stated coupling agents. The HV1 layer coupling agent is preferably an MSA-grafted (maleic anhydride grafted) linear low density polyethylene (LLDPE) with an MFI (melt flow index) of 0.1 to 20 g/min (190° C.; 2.16 kg) and/or the HV2 layer coupling agent is preferably an ethylene (meth)acrylate (E(M)AA). Alternatively, the HV2 layer coupling agent consists of an MSA-grafted LDPE layer and an E(M)AA layer, wherein the latter should preferably be arranged in the layer adjoining the sealing layer.

Ionomers are "ionically crosslinked copolymers of ethylene, propylene, butylene, vinyl esters and unsaturated aliphatic acids, the salts thereof and esters thereof" (see Bundesgesundheitsamt Recommendation XXXV, issue 43, page 114b, Carl Heymanns Verlag, Cologne, June 1994). According to the invention, the ionomer is a copolymer of ethylene and unsaturated aliphatic acids ionically crosslinked with zinc salts, or a polymer blend of these stated ionically crosslinked copolymers with uncrosslinked copolymers prepared from polyolefins and/or acids and/or esters.

Preferred films are those which contain in at least one outer layer up to 1%, preferably up to 0.5% of a lubricant and/or antiblocking agent, wherein the lubricant is particularly preferably added to the sealing layer and is a fatty acid derivative (for example amide wax, such as for example nonyloctyl palmitate amide wax) and/or wherein the antiblocking agent is particularly preferably added to the outer layer A1 and is a modified natural silica product.

At least one layer of the films according to the invention may also be coloured or printed.

Further additional processing stages, such as for example irradiation, corona treatment or other surface treatments are not necessary according to the invention, but are conceivable.

As may readily be understood by the person skilled in the art, film structures which contain further layers or mixtures of the stated substances without fundamentally altering the principal properties of the film, i.e. without departing from the essentials and scope of the invention, are also possible in principle.

Surprisingly, it is possible by means of the composition of the film according to the invention to satisfy the particular requirements for use as a cook-in film.

It is possible by means of the multilayer structure according to the invention to achieve very good thermoformability and good shrinkage capacity.

It was not to be expected that it was also possible to produce a film exhibiting the desired cooking adhesion without irradiation or corona treatment.

The structure according to the invention moreover achieves the necessary delamination strength.

It was not to be predicted that a distinct reduction in jelly formation and the desired slight cooking adhesion are achieved by the structure of the film and in particular by the selected Zn type ionomer.

Conventional film production processes such as blown film or flat film coextrusion may be considered as processes for the production of the film. Flat film coextrusion with in line coextrusion coating is particularly preferred.

If coextrusion is not possible, it is conceivable to produce layers A1, A2, D separately, wherein these layers should be joined together by adhesive lamination. In this case, the laminating adhesive, conventionally a 2-component polyurethane adhesive system, assumes the function of the coupling agent.

Neither the film nor individual layers are irradiated or corona treated.

The features used to assess the films according to the invention were in particular thermoformability, together with jelly formation or jelly deposits and cooking adhesion, as may be observed after production of boil-cured products.

In order to determine thermoformability, the previously produced film samples were tested in modern automatic thermoforming machines as are used in the packaging industry (for example Tiromat, Multivac). To this end, the film webs clamped in the machine were heated in sections by a hot plate. Heating may be performed to this end either from the sealing side or also from the opposite side to the sealing side. The films preheated at hot plate temperatures of 70 to 100° C. were then thermoformed into a tray of edge dimensions 185×115 mm. The depth of the tray was varied between 20 and 70 mm.

The thermoforming result was marked as follows:

1. The thermoforming result is unsatisfactory, an unacceptable number of attempts to form a tray results in tears in the film: Rating "−"
2. The thermoforming result is good, there is no tearing and shaping of the tray is satisfactory: Rating "+"
3. The thermoforming result is very good, there is no tearing and shaping of the tray is very good: Rating "++"

In another test, a meat composition suitably prepared for boil-cured products was placed in the film trays described above. The trays were then further sealed around the edges (edge sealing) to a suitable lidding film using a vacuum and heat. These individual packages were then heated in a controlled manner in a steam-heatable chamber for approximately 12 hours up to a core temperature, measured within the contents, of 70° C. Once cool, the packages were examined and jelly formation or deposits and cooking adhesion assessed.

Assessment of jelly deposits:

Jelly deposits: this is taken to be the separation of liquid exuded from the meat composition between the film and the surface of the meat composition:

1. very good, as no jelly deposit: rating: "none"
2. good, as only slight jelly deposit: rating: "slight"
3. heavy jelly deposits, not acceptable, rating: "heavy"
4. very heavy jelly deposits, also not acceptable, rating: "very heavy"

Assessment of cooking adhesion:

| | | |
|---|---|---|
| 1. | "no" cooking adhesion: | The film virtually falls off the contents when the pack is opened. |
| 2. | "slight" cooking adhesion: | Unlike "no cooking adhesion", there is some pointwise cooking adhesion. The film slides off the contents easily. |
| 3. | "moderate" cooking adhesion: (as desired) | The film may be removed from the contents with slight force without damaging the contents. |
| 4. | "severe" cooking adhesion: | The film may only be removed with greater force and with damage to small areas of the contents (meat torn out). |
| 5. | "very severe" cooking adhesion: | The film may only be removed with still greater force and with damage to large areas of the contents. |

EXAMPLES AND COMPARATIVE EXAMPLES

A Example 1

A multilayer film according to the invention with the structure

A1 / B1 / A2 / C / D
PA / HV1 / PA / HV1 / HV2 / I
32 / 10 / 32 / 10 / 54 / 17 μm, which was produced by flat film coextrusion with in line coextrusion coating.

In this case, C is in two layers (HV1/HV2).

The PA layer polyamide used was a nucleated polyamide 6 of a density of 1140 kg/m³ with a crystallite melting point of 219° C., mixed with an aromatic polyamide of a density of 1190 kg/m³ with a glass transition temperature of 127° C. (ASTM D-3418), the ratio of PA 6 to aromatic PA being 85 to 15, the HV1 layer coupling agent was a maleic anhydride grafted linear low density polyethylene (LLDPE) of a density of 910 kg/m³ with a crystallite melting point of 125° C. The HV2 layer coupling agent is an EMAA with a crystallite melting point of 104° C. and a density of 930 kg/m³. The layer D ionomer is a zinc type ionomer with a density of 950 kg/m³ and a crystallite melting point of 94° C.

The film was neither irradiated nor corona treated.

B Example 2

A multilayer film according to the invention as in example 1, with the difference that the layer thicknesses are 38 / 10 / 38 / 10 / 63 / 21 μm.

The film was neither irradiated nor corona treated.

C Example 3

A multilayer film according to the invention as in example 1, with the difference that the layer thicknesses are 40 / 10 / 40 / 10 / 75 / 25 μm and the outer PA layer also contains 3% of an additive which increases the slip properties of the film.

The film was neither irradiated nor corona treated.

D Comparative example 1

A multilayer film with the structure

A1 / B1 / A2 / C / D
PA / HV1 / PA / HV1 / HV2 / I
32 / 10 / 32 / 10 / 54 / 17 μm.

The same raw materials were used as in the film according to the invention, with the difference that a sodium type ionomer with a density of 940 kg/m³ and a crystallite melting point of 99° C. was used in layer D.

The film was neither irradiated nor corona treated.

E Comparative example 2

A multilayer film with the structure

A1 / B2 / A2 / C / D
PA / HV1 / PA HV1 / HV2 / sealing layer
25 / 10 / 25 / 10 / 75 / 25 μm.

Layer D does not consist of an ionomer, but of an ethylene vinyl acetate copolymer with a density of 925 kg/m³ and a crystallite melting point of 101° C.

The film was neither irradiated nor corona treated.

F Comparative example 3

A multilayer film with the structure

PA / adhesive / I
70 / - / 85 μm.

The PA and I layers were first produced separately on a blown film extrusion plant and then joined together by adhesive lamination. The same polyamide and the same ionomer were used as in example 1. The adhesive used was a conventional adhesive containing solvent applied at a rate of approximately 3.5 g/m².

The film was neither irradiated nor corona treated.

The lidding film used for all the packages was a conventional commercial multilayer film Combitherm XXI from Wolff Walsrode AG, Bomlitz with a total layer thickness of 80 μm. Only the tray area was evaluated in the comparative assessment.

TABLE 1

| Film | Thermo-formability | Jelly deposits | Cooking adhesion |
|---|---|---|---|
| A Example 1 | ++ | none | moderate |
| B Example 2 | ++ | none | moderate |
| C Example 3 | ++ | none | moderate |
| D Comparison 1 | ++ | heavy | slight |
| E Comparison 2 | + | very heavy | none |
| F Comparison 3 | + | heavy | slight |

In comparison with the comparative examples, all the films according to the invention exhibited very good thermoforming properties. They exhibited no delamination after the thermal and mechanical stresses of the boiling operation. The sealed seams of the packages with the films according to the invention also withstood these stresses. All the sealed seams remained completely closed.

The films according to the invention exhibited no jelly deposits after the boiling operation. They moreover had a desired moderate cooking adhesion to the contents such that the film could be separated, as desired, from the contents with slight force without damaging the contents.

Comparative example 1 has a similar structure to the films according to the invention and also exhibits very good thermoformability. However, this structure alone is clearly not sufficient to fulfil the desired requirements during the production of boil-cured products, as this film exhibits heavy jelly deposits and only slight cooking adhesion.

Films according to comparative example 2 have a similar sequence of layers to the films according to the invention. These films have good thermoformability. They exhibited undesirable, very heavy jelly deposits and no cooking adhesion.

Films according to comparative example 3, like the films according to the invention, have a zinc type ionomer as the sealing layer, but an entirely different structure and they exhibit only good thermoforming properties. The zinc type ionomer alone is not sufficient for good properties when assessing jelly deposits and cooking adhesion. Films according to comparison 3 led to heavy jelly deposits and only to slight cooking adhesion.

It is clear that very good thermoforming properties, the desired cooking adhesion and no jelly deposits may only be achieved by the film structure according to the invention characterised by the layer sequence of the stated polymers.

We claim:

1. Multilayer film comprising the layer structure A1 / B1 /A2 / C / D /, wherein
   A1 is a polyamide layer, wherein the polyamide component consists of a member selected from the group consisting of PA-6, PA-11, PA-12, PA-6,6, PA-6,9, PA-6,10, PA-6,11, PA-6,12, a copolymer prepared from monomer units from which the foregoing are formed, and mixtures thereof, B1 is a coupling agent layer, A2 is a polyamide layer, wherein the polyamide component consists of a member selected from the group consisting of PA-6, PA-11, PA-12, PA-6,6, PA-6,9, PA-6,10, PA-6,11, PA-6,12, a copolymer prepared from monomer units from which the foregoing are formed, and mixtures thereof, C is a coupling agent layer, which consists of either a single layer or two layers of different or identical materials, D is a sealing layer made from a Zinc ionomer, and wherein said film is thermoformable and heat sealable and wherein the individual layers optionally include stabilizers, processing auxiliaries, lubricants or antiblocking agents.

2. Film according to claim 1, wherein said coupling agent layers are selected from the group consisting of anhydride-modified polyethylene, acid copolymer of ethylene, acid-modified ethylene (meth) acrylate, anhydride-modified ethylene (meth) acrylate, anhydride-modified ethylene vinyl acetate, acid-modified vinyl acetate, acrylate-modified vinylacetate or a polymer blend comprising at least one of the foregoing.

3. Film according to claim 1, wherein said ionomer is a copolymer of ethylene and unsaturated aliphatic acids ionically crosslinked with zinc salts, or a polymer blend of the same with uncrosslinked copolymers prepared from polyolefins, acids and esters.

4. Film according to claim 1, wherein said total layer thickness is 50 to 300 $\mu$m and the layer thickness of layer A1 is 15–25%, B1 is 3–10%, A2 is 15–25%, C is 25–55%, D is 5–25%, relative to the total film thickness.

5. Film according to claim 1, wherein at least one outer layer contains up to 1 wt. % of a lubricant or antiblocking agent.

6. Process for the production of a film according to claim 1, wherein flat film coextrusion with in line coextrusion coating is used.

7. A composite film including as one element a film according to claim 1.

8. A foodstuff packaged in a film according to claim 1.

9. In the production of a boil-cured packaged foodstuff comprising the steps of packaging an uncured foodstuff in a film, and then boil-curing the packaged foodstuff, the improvement which comprises employing as the film a film according to claim 1.

* * * * *